(12) United States Patent
Ko et al.

(10) Patent No.: US 12,472,921 B2
(45) Date of Patent: Nov. 18, 2025

(54) APPARATUS AND METHOD FOR VEHICLE CONTROL FOR AUTONOMOUS DRIVING

(71) Applicant: 42dot Inc., Seoul (KR)

(72) Inventors: Chan Ho Ko, Yongin-si (KR); Kyu Hwan Yeon, Suwon-si (KR)

(73) Assignee: 42dot Inc., Seoul (KR)

( * ) Notice: Subject to any disclaimer, the term of this patent is extended or adjusted under 35 U.S.C. 154(b) by 92 days.

(21) Appl. No.: 18/510,143

(22) Filed: Nov. 15, 2023

(65) Prior Publication Data
US 2024/0166189 A1    May 23, 2024

(30) Foreign Application Priority Data

Nov. 17, 2022   (KR) ........................ 10-2022-0154877

(51) Int. Cl.
| | | |
|---|---|---|
| *B60W 10/20* | (2006.01) | |
| *B60W 40/105* | (2012.01) | |
| *B60W 40/107* | (2012.01) | |
| *B60W 40/109* | (2012.01) | |
| *B60W 40/114* | (2012.01) | |
| *B60W 50/00* | (2006.01) | |
| *B60W 60/00* | (2020.01) | |

(52) U.S. Cl.
CPC .......... *B60W 10/20* (2013.01); *B60W 40/105* (2013.01); *B60W 40/107* (2013.01); *B60W 40/109* (2013.01); *B60W 40/114* (2013.01); *B60W 50/00* (2013.01); *B60W 60/001* (2020.02); *B60W 2050/0031* (2013.01); *B60W 2050/0056* (2013.01); *B60W 2520/105* (2013.01); *B60W 2520/14* (2013.01)

(58) Field of Classification Search
CPC .. B60W 10/20; B60W 60/001; B60W 40/105; B60W 40/107; B60W 40/114; B60W 50/00; B60W 2050/0031; B60W 2050/0056; B60W 2520/105; B60W 2520/14; B60W 40/109; B60W 2520/12; B60W 2520/125
See application file for complete search history.

(56) References Cited

U.S. PATENT DOCUMENTS

| | | | |
|---|---|---|---|
| 12,043,309 B2 * | 7/2024 | Prasad Challa | B60W 50/029 |
| 2023/0182810 A1 * | 6/2023 | Zuo | B62D 15/025 |
| | | | 701/41 |

OTHER PUBLICATIONS

Kim, S., et al., Lateral Control of a Commercial Vehicle Using Feedback Augmented Disturbance Observer, SAE International Technical Paper 2022-01-0093, Mar. 29, 2022, doi:10.4271/2022-01-0093, 10 pages.

* cited by examiner

*Primary Examiner* — Jacob M Amick
(74) *Attorney, Agent, or Firm* — Kilpatrick Townsend & Stockton LLP (57) ABSTRACT

A vehicle control apparatus and method are disclosed. A vehicle control apparatus for autonomous driving includes a receiver configured to receive a local path based on a trajectory planner, and a controller configured to generate a steering command for lateral control of the vehicle based on the local path, generate a compensated steering command by compensating the steering command based on a movement state of a vehicle to be controlled, and control the vehicle based on the compensated steering command.

15 Claims, 4 Drawing Sheets

APPARATUS AND METHOD FOR VEHICLE CONTROL FOR AUTONOMOUS DRIVING

CROSS-REFERENCE TO RELATED APPLICATION

This application claims the benefit of Korean Patent Application No. 10-2022-0154877 filed on Nov. 17, 2022, in the Korean Intellectual Property Office, the entire disclosure of which is incorporated herein by reference for all purposes.

BACKGROUND

1. Field of the Invention

One or more embodiments relate to an apparatus and method for vehicle control for autonomous driving.

2. Description of the Related Art

Autonomous driving vehicles are vehicles that may autonomously drive without manipulation of a driver. The autonomous driving vehicle recognizes a surrounding environment using various sensors and autonomously drives when a destination is designated.

Lateral control and longitudinal control are required to perform the autonomous driving. The lateral control refers to automatic steering performed while keeping a lane, and the longitudinal control refers to control of a driving speed of a vehicle by recognizing various objects around the vehicle.

SUMMARY

According to an aspect, there is provided a vehicle control apparatus for autonomous driving including a receiver configured to receive a local path based on a trajectory planner, and a controller configured to generate a steering command for lateral control of the vehicle based on the local path, generate a compensated steering command by compensating the steering command based on a movement state of a vehicle to be controlled, and control the vehicle based on the compensated steering command.

The controller may be configured to compensate the steering command based on a speed of the vehicle, an acceleration of the vehicle, a yaw rate of the vehicle, and a steering angle of the vehicle.

The controller may be configured to calculate a tire angle of the vehicle based on a wheel base of the vehicle, the speed, and the yaw rate, and compensate the steering command based on the tire angle.

The controller may be configured to calculate the yaw rate by compensating an initial yaw rate measured using an inertial measurement unit (IMU) based on a bias.

The controller may be configured to perform filtering on an initial yaw rate measured at a time point at which the vehicle stops, and determine the bias based on the initial yaw rate subjected to the filtering.

The controller may be configured to calculate an inverse function value by inputting the movement state to an inverse vehicle model;
 calculate a disturbance value by performing filtering based on the inverse function value and the steering command; and
 compensate the steering command based on the disturbance value.

The inverse vehicle model may be generated based on a mathematical model used to generate the steering command.

The controller may be configured to calculate the disturbance value by filtering a value obtained by subtracting the steering command, from which the disturbance value is removed, from the inverse function value; and compensate the steering command by removing the disturbance value from the steering command.

The controller may be configured to calculate the disturbance value by performing low pass filtering on a value obtained by subtracting the steering command, from which the disturbance value is removed, from the inverse function value.

According to another aspect, there is provided a vehicle control method for autonomous driving, the method including receiving a local path based on a trajectory planner, generating a steering command for lateral control of the vehicle based on the local path, generating a compensated steering command by compensating the steering command based on a movement state of a vehicle to be controlled, and controlling the vehicle based on the compensated steering command.

The generating of the compensated steering command may include compensating the steering command based on a speed of the vehicle, an acceleration of the vehicle, a yaw rate of the vehicle, and a steering angle of the vehicle.

The compensating of the steering command may include calculating a tire angle of the vehicle based on a wheel base of the vehicle, the speed, and the yaw rate, and compensating the steering command based on the tire angle.

The generating of the compensated steering command may further include calculating the yaw rate by compensating an initial yaw rate measured using an IMU based on a bias.

The calculating of the yaw rate may include performing filtering on the initial yaw rate measured at a time point at which the vehicle stops, and determining the bias based on the initial yaw rate subjected to the filtering.

The generating of the compensated steering command may include calculating an inverse function value by inputting the movement state to an inverse vehicle model, calculating a disturbance value by performing filtering based on the inverse function value and the steering command, and compensating the steering command based on the disturbance value.

The inverse vehicle model may be generated based on a mathematical model used to generate the steering command.

The calculating of the disturbance value may include calculating the disturbance value by filtering a value obtained by subtracting the steering command, from which the disturbance value is removed, from the inverse function value, and the compensating of the steering command based on the disturbance value may include compensating the steering command by removing the disturbance value from the steering command.

The calculating of the disturbance value may include calculating the disturbance value by performing low pass filtering on a value obtained by subtracting the steering command, from which the disturbance value is removed, from the inverse function value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. As used herein, "at least one of A and B", "at least one of A, B, or C," and the like, each of which may include any one of the items listed together in the corresponding one of the phrases, or all possible combinations thereof.

It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, an embodiment will be described in detail with reference to the accompanying drawings. When describing the embodiments with reference to the accompanying drawings, like reference numerals refer to like elements and a repeated description related thereto will be omitted.

Figure 1:
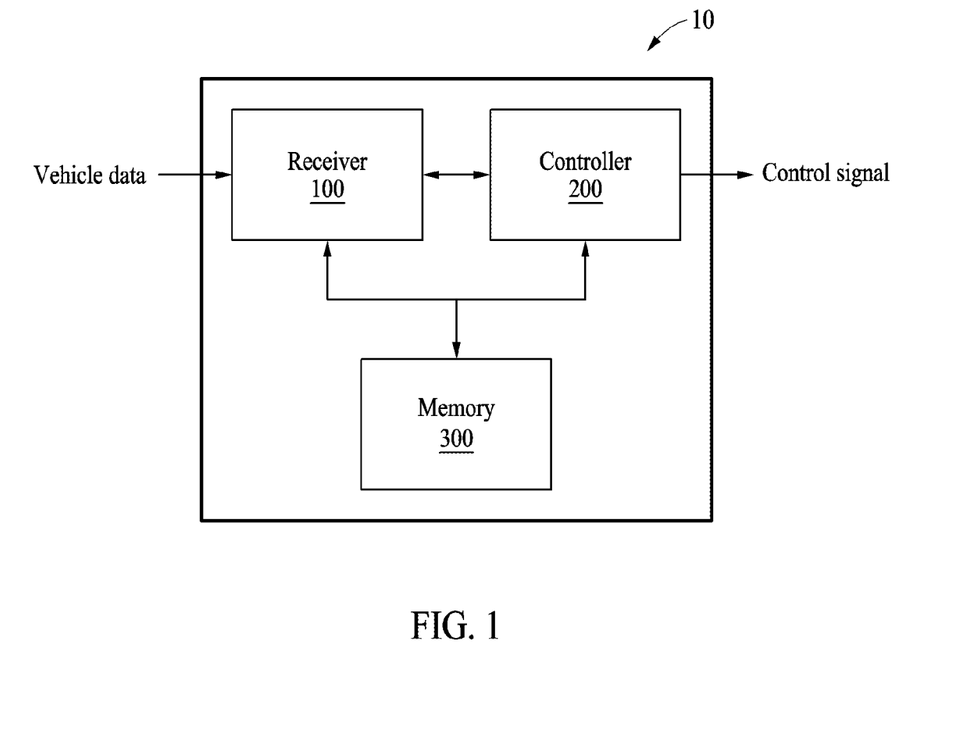
FIG. 1 is a schematic block diagram of a vehicle control apparatus according to an embodiment.

FIG. 1 is a schematic block diagram of a vehicle control apparatus according to an embodiment.

Referring to FIG. 1, a vehicle control apparatus 10 may control a vehicle. The vehicle may refer to a vehicle designed to be used to deliver a person or goods. The vehicle may include, for example, a car, train, ship, boat, airplane, and/or bicycle. The vehicle control apparatus 10 may be implemented on the inside or outside of the vehicle.

The vehicle control apparatus 10 may control the vehicle for autonomous driving of the vehicle. The vehicle control apparatus 10 may perform the autonomous driving of the vehicle by controlling the vehicle based on a detection result received from one or more sensors. The sensors may include a laser imaging detection and ranging (LiDAR) sensor, a radio detection and ranging (RADAR) sensor, a camera (e.g., a stereo camera), and/or an ultrasonic sensor.

The autonomous driving may refer to an operation in which the vehicle drives by itself by recognizing a driving environment, determining dangerous elements, and deriving an optimal path, while a driver does not operate the vehicle partially or entirely.

The vehicle control apparatus 10 includes a receiver 100 and a processor. The vehicle control apparatus 10 may further include a memory 300.

The receiver 100 may include a reception interface. The receiver 100 may receive a detection result received from the sensor. The receiver 100 may receive data from a module positioned at the outside of the vehicle control apparatus 10. For example, the receiver 100 may receive a local path based on a trajectory planner. The receiver 100 may output received data to a controller 200. The trajectory planner may generate a path for a vehicle to move (e.g., a local path or a global path). The trajectory planner may generate the local path to be followed for operations such as avoidance, a lane change, and lane keeping along the global path. A trajectory generated by the trajectory planner may include a lateral trajectory and/or longitudinal trajectory.

The global path may include a path in the unit of a road or intersection through which the autonomous driving vehicle moves from a point of departure to a destination. For example, the global path may include a path guided by a navigation system. The local path may include a path in the unit of a lane to be followed by a vehicle when the vehicle performs a lane change, lane keeping, or avoidance within the global path. The trajectory planner may generate the local path based on the global path.

The controller 200 may generate a control signal for controlling the vehicle based on the received path. The controller 200 may generate the control signal using a processor. The controller 200 may include one or more processors.

The processor may process data stored in the memory 300. The processor may execute computer-readable code (e.g., software) stored in the memory 300 and instructions derived by the processor.

The "processor" may be a data processing apparatus implemented by hardware including a circuit having a physical structure to perform desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The controller 200 may generate a steering command for the lateral control of the vehicle based on the received local path. The steering command may refer to a control signal for controlling a steering device for adjusting a direction of tires of a vehicle.

The controller 200 may generate a compensated steering command by compensating the steering command based on a movement state of a vehicle to be controlled. The movement state of the vehicle may include a speed of the vehicle, an acceleration of the vehicle, a yaw rate of the vehicle, and/or a steering angle of the vehicle.

The controller 200 may compensate the steering command based on the speed of the vehicle, the acceleration of the vehicle, the yaw rate of the vehicle, and the steering angle of the vehicle.

The controller 200 may calculate a tire angle of the vehicle based on a wheel base of the vehicle, the speed, and the yaw rate. The controller 200 may calculate the yaw rate by compensating an initial yaw rate measured using an inertial measurement unit (IMU) based on a bias. The controller 200 may perform filtering on the initial yaw rate measured at a time point at which the vehicle stops. The controller 200 may determine the bias based on the initial yaw rate subjected to the filtering. The process of calculating the yaw rate will be described in more detail with reference to FIG. 5.

The controller 200 may compensate the steering command based on the tire angle.

The controller 200 may calculate an inverse function value by inputting the movement state to an inverse vehicle model. The inverse vehicle model may be generated based on a mathematical model used to generate a steering command.

The controller 200 may calculate a disturbance value by performing filtering based on the inverse function value and the steering command. The controller 200 may compensate the steering command based on the disturbance value.

The controller 200 may calculate the disturbance value by filtering a value obtained by subtracting the steering command, from which the disturbance value is removed, from the inverse function value. The controller 200 may calculate the disturbance value by performing low pass filtering on the value obtained by subtracting the steering command, from which the disturbance value is removed, from the inverse function value. The controller 200 may compensate the steering command by removing the disturbance value from the steering command.

The controller 200 may control the vehicle based on the compensated steering command.

The memory 300 may store data for computation or a computation result. The memory 300 may store instructions (or programs) executable by the processor. For example, the instructions may include instructions to perform an operation of the processor and/or an operation of each element of the processor.

The memory 300 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic random-access memory (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, or an insulator resistance change memory.

Figure 2:
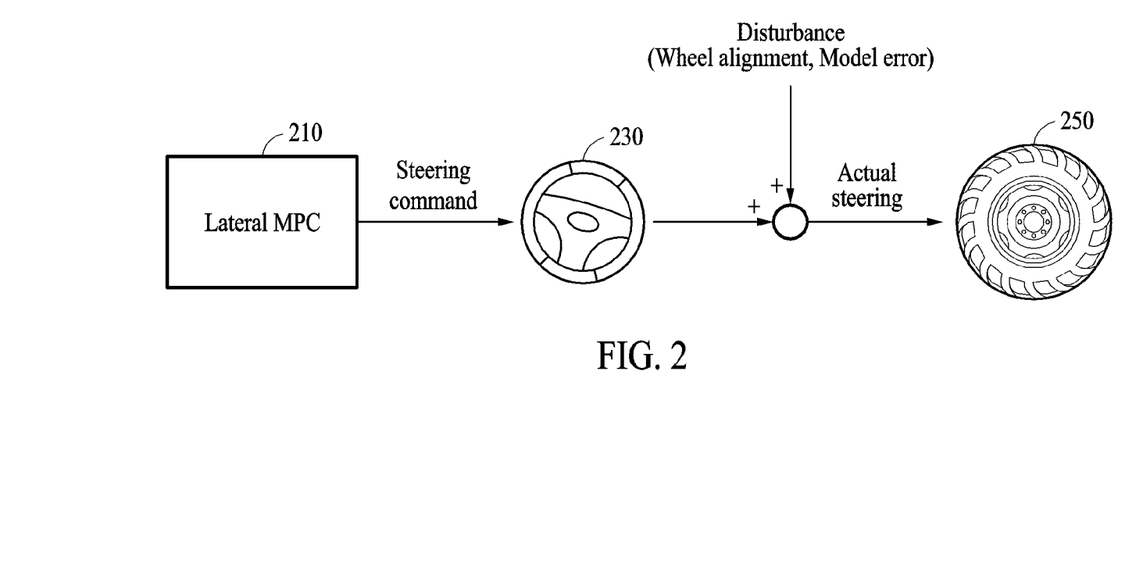
FIG. 2 is a diagram illustrating lateral control for autonomous driving.

FIG. 2 is a diagram illustrating lateral control for autonomous driving.

Referring to FIG. 2, a controller (e.g., the controller 200 of FIG. 1) may include a lateral model predictive control (MPC) 210. The lateral MPC 210 may perform control processing satisfying a set of predefined constraints. The lateral MPC 210 may perform lateral control based on a dynamic model. The lateral MPC 210 may perform the lateral control by estimating the local path.

The lateral MPC 210 may generate a steering command for controlling a steering wheel 230. The controller 200 may adjust a direction of a tire 250 by controlling the steering wheel 230 using the steering command.

The direction of the tire adjusted through the steering command may have an error occurring due to disturbance. The disturbance may occur due to an error due to wheel alignment or a model error. An actual steering value may include a steering value intended by the steering command and the error due to the disturbance.

Figure 3:
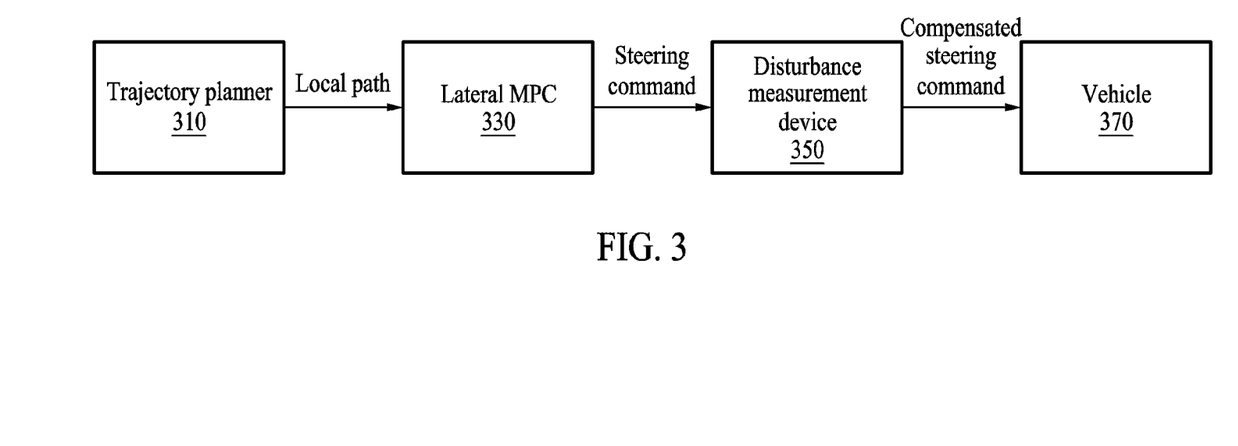
FIG. 3 is a diagram illustrating a vehicle control operation of the vehicle control apparatus shown in FIG. 1.

FIG. 3 is a diagram illustrating a vehicle control operation of the vehicle control apparatus shown in FIG. 1.

Referring to FIG. 3, a controller (e.g., the controller 200 of FIG. 1) may include a lateral MPC 330 and a disturbance measurement device 350. Optionally, the controller 200 may further include a trajectory planner 310.

The controller 200 may accurately control a vehicle 370 by compensating a steering command generated by the lateral MPC 330 based on a disturbance value measured by the disturbance measurement device 350.

The trajectory planner 310 may generate a path (e.g., a local path or a global path) through which the vehicle 370 moves. The trajectory planner 310 may output a local path generated by the lateral MPC 330.

The lateral MPC 330 may generate the steering command for lateral control of the vehicle 370 based on the local path. The lateral MPC 330 may output the steering command to the disturbance measurement device 350.

The disturbance measurement device 350 may generate a compensated steering command by compensating the steering command based on a movement state of the vehicle 370 to be controlled. The disturbance measurement device 350 may compensate the steering command based on a speed of the vehicle 370, an acceleration of the vehicle 370, a yaw rate of the vehicle 370, and a steering angle of the vehicle 370.

The disturbance measurement device 350 may compensate the steering command based on a tire angle. The disturbance measurement device 350 may calculate an inverse function value by inputting the movement state to an inverse vehicle model. The inverse vehicle model may be generated based on a mathematical model used to generate a steering command.

The disturbance measurement device 350 may calculate a disturbance value by performing filtering based on the inverse function value and the steering command. The controller 200 may compensate the steering command based on the disturbance value.

The disturbance measurement device 350 may calculate the disturbance value by filtering a value obtained by subtracting the steering command, from which the disturbance value is removed, from the inverse function value. The disturbance measurement device 350 may calculate the disturbance value by performing low pass filtering on the value obtained by subtracting the steering command, from which the disturbance value is removed, from the inverse function value. The disturbance measurement device 350 may compensate the steering command by removing the disturbance value from the steering command.

The controller 200 may remove the vehicle 370 based on the compensated steering command.

Figure 4:
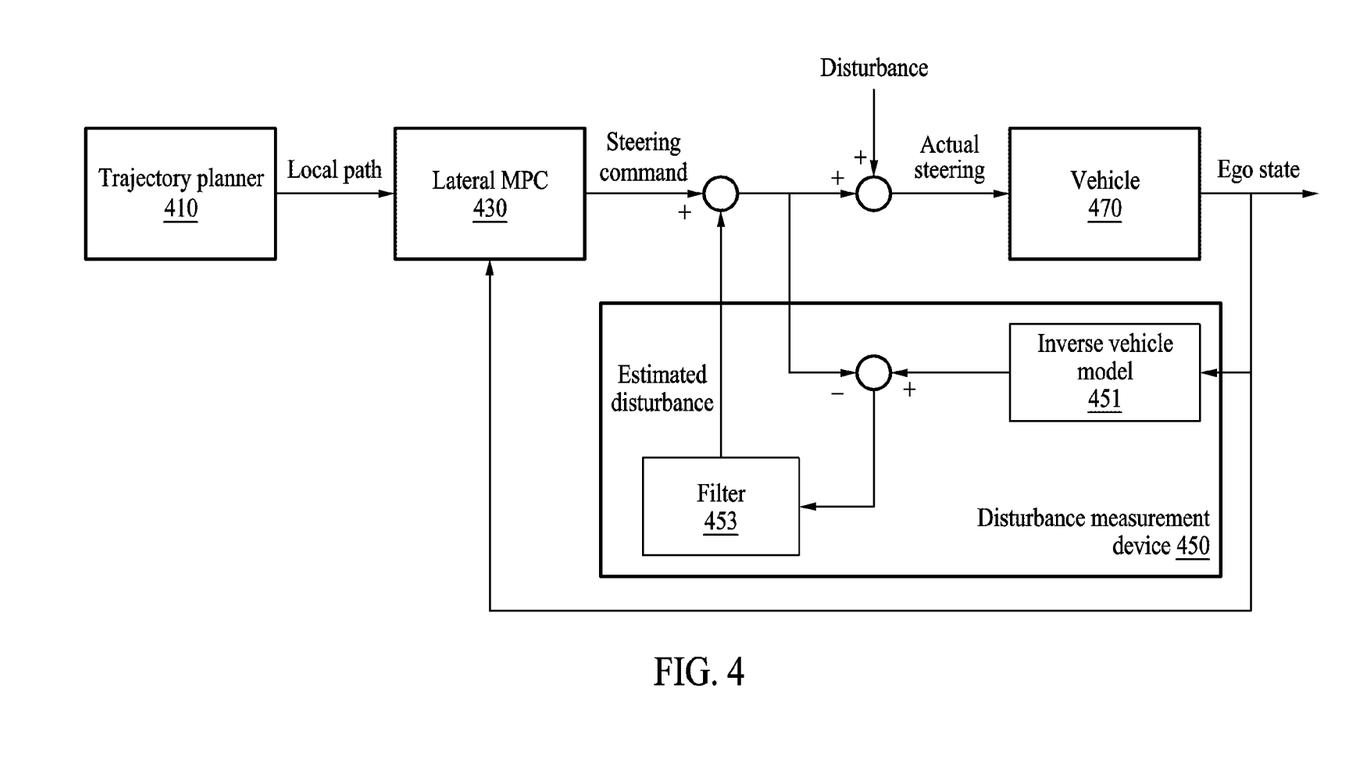
FIG. 4 illustrates an example of implementing the vehicle control apparatus shown in FIG. 1.
Figure 5:
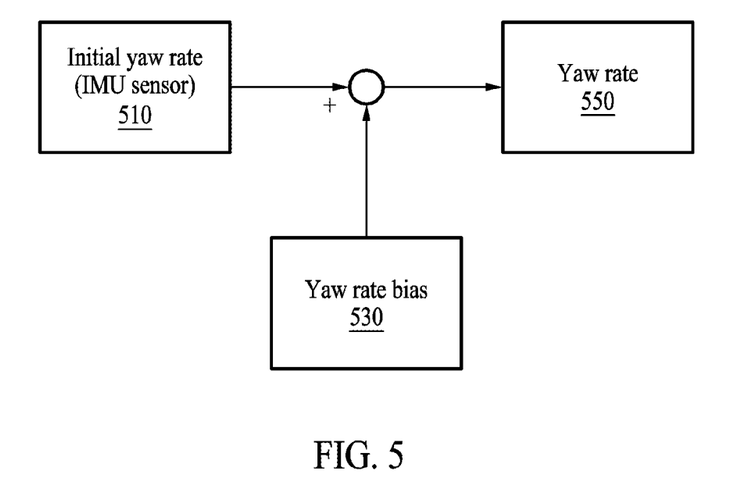
FIG. 5 is a diagram illustrating a process of calculating a yaw rate.

FIG. 4 illustrates an example of implementing the vehicle control apparatus shown in FIG. 1, and FIG. 5 is a diagram illustrating a process of calculating a yaw rate.

Referring to FIGS. 4 and 5, a controller (e.g., the controller 200 of FIG. 1) may include a lateral MPC 430 and a disturbance measurement device 450. Optionally, the controller 200 may further include a trajectory planner 410.

The trajectory planner 410, the lateral MPC 430, and the disturbance measurement device 450 may operate in the same manner as the trajectory planner 310, the lateral MPC 330, and the disturbance measurement device 350 of FIG. 3, respectively. The repeated description of the trajectory planner 410, the lateral MPC 430, and the disturbance measurement device 450 with those of FIG. 3 will be omitted.

The disturbance measurement device 450 may measure a disturbance based on an ego state of the vehicle 470. The ego state may include a movement state of the vehicle 470. The ego state may include a speed of the vehicle 470 (e.g., a longitudinal speed of the vehicle 470), an acceleration of the vehicle 470 (e.g., a longitudinal acceleration of the vehicle 470), a yaw rate, and a steering angle.

The disturbance measurement device 450 may calculate a tire angle of the vehicle 470 based on a wheel base of the vehicle 470, the speed, and the yaw rate. The disturbance measurement device 450 may calculate the tire angle based on a value obtained by dividing the wheel base by an ego speed and multiplying a resultant value by the yaw rate. For example, the disturbance measurement device 450 may calculate the tire angle by performing an arc tangent operation on the value obtained by dividing the wheel base by the ego speed and multiplying the resultant value by the yaw rate The ego speed may include the speed of the vehicle 470.

The disturbance measurement device 450 may calculate a yaw rate 550 by compensating an initial yaw rate 510 measured using the IMU based on a bias.

The initial yaw rate 510 measured by the IMU may be biased according to the characteristics of the IMU. The disturbance measurement device 450 may estimate a yaw rate bias 530.

When the vehicle 470 stops, the disturbance measurement device 450 may measure the initial yaw rate 510. The disturbance measurement device 450 may estimate the initial yaw rate 510 several times.

Theoretically, the yaw rate of the stopped vehicle may be 0. When the initial yaw rate 510 measured through the IMU is not 0, the disturbance measurement device 450 may estimate the yaw rate bias 530 based on the initial yaw rate 510 measured from the stopped vehicle.

The disturbance measurement device 450 may perform filtering on the initial yaw rate 510 measured at a time point at which the vehicle 470 stops. The disturbance measurement device 450 may estimate the yaw rate bias 530 by performing low pass filtering on the initial yaw rate 510. the disturbance measurement device 450 may determine the yaw rate bias 530 based on the initial yaw rate 510 subjected to the filtering.

The disturbance measurement device 450 may calculate the yaw rate 550 by subtracting the estimated yaw rate bias 530 from the initial yaw rate 510.

The disturbance measurement device 450 may calculate an inverse function value by inputting the movement state to an inverse vehicle model 451. The inverse vehicle model 451 model may be generated based on a mathematical model used to generate a steering command. The disturbance measurement device 450 may explicitly derive the inverse vehicle model 451 with respect to a steering angle using the mathematical model used in the lateral MPC 430.

The disturbance measurement device 450 may perform filtering by inputting a value obtained by subtracting a steering command from an output of the inverse vehicle model 451 to a filter 453. The filter 453 may be implemented as a magnitude limiter, a rate limiter, or a low pass filter. The low pass filter may be a primary low pass filter.

The disturbance measurement device 450 may operate in a plurality of system modes. The plurality of system modes may include an autonomous driving mode and a manual driving mode. The autonomous driving mode may include a map mode and a vision mode. The map mode may be an autonomous driving mode based on a detailed map. The vision mode may be an autonomous driving mode based on a measurement result (e.g., a lane or stop line) of a vision sensor.

The disturbance measurement device 450 may determine whether the movement state of the vehicle and the local path received from the trajectory planner 410 satisfy a design standard. When the design standard is satisfied, the disturbance measurement device 450 may perform disturbance measurement.

For example, the disturbance measurement device 450 may determine whether an average curvature of the local path is lower than a design curvature. The disturbance measurement device 450 may determine whether the speed of the vehicle 470 is higher than a design speed. The disturbance measurement device 450 may determine whether the magnitude of the steering angle of the vehicle 470 is less than a design angle. The disturbance measurement device 450 may determine whether the yaw rate of the vehicle 470 is less than a design yaw rate. The disturbance measurement device 450 may determine whether the magnitude of the longitudinal acceleration of the vehicle 470 is less than a design acceleration.

When at least one condition is satisfied from results of the above determination, the disturbance measurement device 450 may perform the disturbance measurement. For example, when all conditions are satisfied in the results of the above determination, the disturbance measurement device 450 may perform the disturbance measurement.

Figure 6:
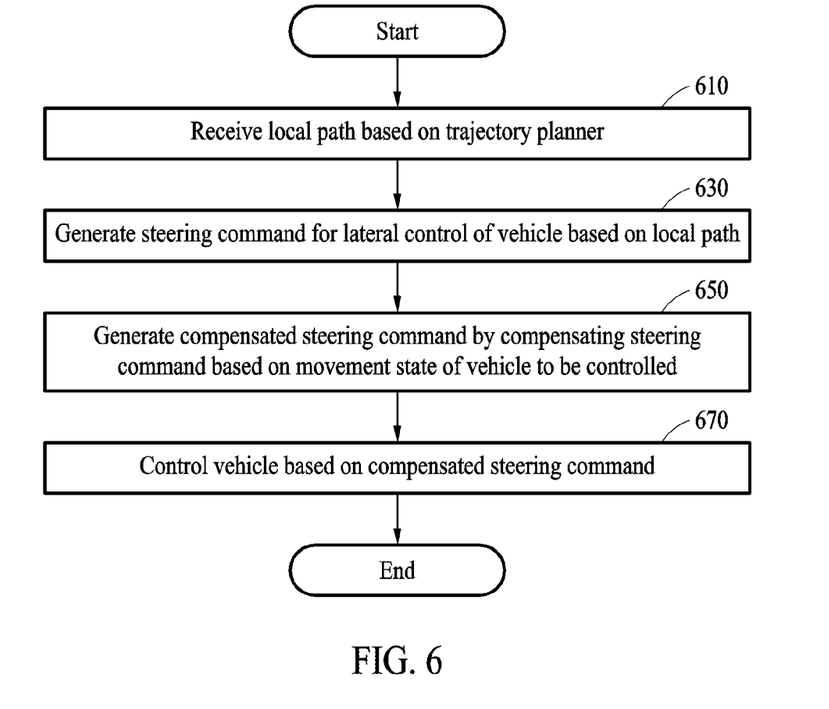
FIG. 6 is a flowchart of an operation of the vehicle control apparatus shown in FIG. 1.

FIG. 6 is a flowchart of an operation of the vehicle control apparatus shown in FIG. 1.

Referring to FIG. 6, in operation 610, a receiver (e.g., the receiver 100 of FIG. 1) may receive a local path based on a trajectory planner.

In operation 630, a controller (e.g., the controller 200 of FIG. 1) may generate a steering command for lateral control of a vehicle based on the received local path.

In operation 650, the controller 200 may generate a compensated steering command by compensating the steering command based on a movement state of the vehicle to be controlled. The controller 200 may compensate the steering command based on a speed of the vehicle, an acceleration of the vehicle, a yaw rate of the vehicle, and a steering angle of the vehicle. The controller 200 may calculate a tire angle of the vehicle based on a wheel base of the vehicle, the speed, and the yaw rate.

The controller 200 may calculate the yaw rate by compensating an initial yaw rate measured using an IMU based on a bias. The controller 200 may perform filtering on the initial yaw rate measured at a time point at which the vehicle stops. The controller 200 may determine the bias based on the initial yaw rate subjected to the filtering.

The controller 200 may compensate the steering command based on the tire angle. The controller 200 may calculate an inverse function value by inputting the movement state to an inverse vehicle model. The inverse vehicle model may be generated based on a mathematical model used to generate the steering command.

The controller 200 may calculate a disturbance value by performing filtering based on the inverse function value and the steering command. The controller 200 may compensate the steering command based on the disturbance value.

The controller 200 may calculate the disturbance value by filtering a value obtained by subtracting the steering command, from which the disturbance value is removed, from the inverse function value. The controller 200 may calculate the disturbance value by performing low pass filtering on the value obtained by subtracting the steering command, from which the disturbance value is removed, from the inverse function value. The controller 200 may compensate the steering command by removing the disturbance value from the steering command.

In operation 670, the controller 200 may control the vehicle based on the compensated steering command.

The examples described herein may be implemented using hardware components, software components and/or combinations thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A vehicle control apparatus for autonomous driving comprising:
a receiver configured to receive a local path based on a trajectory planner; and
a controller configured to:

generate a steering command for lateral control of the vehicle based on the local path;

calculate a yaw rate of the vehicle by compensating an initial yaw rate measured using an inertial measurement unit (IMU) based on a bias;

generate a compensated steering command by compensating the steering command based on a movement state of a vehicle to be controlled, wherein the controller is configured to compensate the steering command based on a speed of the vehicle, an acceleration of the vehicle, the yaw rate of the vehicle, and a steering angle of the vehicle; and control the vehicle based on the compensated steering command.

2. The vehicle control apparatus of claim 1, wherein the controller is configured to:

calculate a tire angle of the vehicle based on a wheel base of the vehicle, the speed, and the yaw rate; and compensate the steering command based on the tire angle.

3. The vehicle control apparatus of claim 1, wherein the controller is configured to:

perform filtering on an initial yaw rate measured at a time point at which the vehicle stops; and determine the bias based on the initial yaw rate subjected to the filtering.

4. The vehicle control apparatus of claim 1, wherein the controller is configured to:

calculate an inverse function value by inputting the movement state to an inverse vehicle model;

calculate a disturbance value by performing filtering based on the inverse function value and the steering command; and compensate the steering command based on the disturbance value.

5. The vehicle control apparatus of claim 4, wherein the inverse vehicle model is generated based on a mathematical model used to generate the steering command.

6. The vehicle control apparatus of claim 4, wherein the controller is configured to:

calculate the disturbance value by filtering a value obtained by subtracting the steering command, from which the disturbance value is removed, from the inverse function value; and compensate the steering command by removing the disturbance value from the steering command.

7. The vehicle control apparatus of claim 4, wherein the controller is configured to calculate the disturbance value by performing low pass filtering on a value obtained by subtracting the steering command, from which the disturbance value is removed, from the inverse function value.

8. A vehicle control method for autonomous driving, the method comprising:

receiving a local path based on a trajectory planner;

generating a steering command for lateral control of the vehicle based on the local path;

calculating a yaw rate of the vehicle by compensating an initial yaw rate measured using an inertial measurement unit (IMU) based on a bias;

generating a compensated steering command by compensating the steering command based on a movement state of a vehicle to be controlled;

controlling the vehicle based on the compensated steering command; and wherein the generating of the compensated steering command comprises compensating the steering command based on a speed of the vehicle, an acceleration of the vehicle, the yaw rate of the vehicle, and a steering angle of the vehicle.

9. The method of claim 8, wherein the compensating of the steering command comprises:

calculating a tire angle of the vehicle based on a wheel base of the vehicle, the speed, and the yaw rate; and compensating the steering command based on the tire angle.

10. The method of claim 8, wherein the calculating of the yaw rate comprises:

performing filtering on the initial yaw rate measured at a time point at which the vehicle stops; and determining the bias based on the initial yaw rate subjected to the filtering.

11. The method of claim 8, wherein the generating of the compensated steering command comprises:

calculating an inverse function value by inputting the movement state to an inverse vehicle model;

calculating a disturbance value by performing filtering based on the inverse function value and the steering command; and compensating the steering command based on the disturbance value.

12. The method of claim 11, wherein the inverse vehicle model is generated based on a mathematical model used to generate the steering command.

13. The method of claim 11, wherein the calculating of the disturbance value comprises calculating the disturbance value by filtering a value obtained by subtracting the steering command, from which the disturbance value is removed, from the inverse function value, and wherein the compensating of the steering command based on the disturbance value comprises compensating the steering command by removing the disturbance value from the steering command.

14. The method of claim 11, wherein the calculating of the disturbance value comprises:

calculating the disturbance value by performing low pass filtering on a value obtained by subtracting the steering command, from which the disturbance value is removed, from the inverse function value.

15. A non-transitory computer-readable storage medium storing instructions that, when executed by a processor, cause the processor to perform the method of claim 8.

* * * * *